United States Patent Office 3,522,161
Patented July 28, 1970

3,522,161
PROCESS FOR PRODUCING THIOL OR SULFIDE DERIVATIVES OF 1,2-BIS(3-CYCLOHEXEN-1-YL) ETHYLENE
Rector P. Louthan, Bartlesville, Okla., assignor to Phillips Petroleum Company, a corporation of Delaware
No Drawing. Continuation-in-part of application Ser. No. 502,547, Oct. 22, 1965. This application June 27, 1968, Ser. No. 740,477
Int. Cl. B01j 1/10; C07c 149/26
U.S. Cl. 204—162    5 Claims

ABSTRACT OF THE DISCLOSURE 1,2-bis(3 - cyclohexen - 1-yl)ethylene and derivatives thereof are converted to thiols and/or sulfides by reacting with a thiol. These compounds are useful as polymerization agents for conjugated dienes.

---

This is a continuation-in-part of my copending application Ser. No. 502,547, filed Oct. 22, 1965 now Pat. No. 3,413,355.

This invention relates to the preparation of novel organic sulfur compounds. In one aspect it relates to a process for converting 1,2 - bis(3-cyclohexen - 1-yl)ethylenes to novel thiols and/or sulfides.

The starting material used in the reaction described hereinafter is disclosed in a copending case (Ser. No. 502,544, filed Oct. 22, 1965 now abandoned), assigned to a common assignee. The above-referenced application discloses, interalia, the preparation of the starting materials of this invention by contacting an alkenyl-substituted cycloalkene such as 4-vinylcyclohexene with a molybdenum or tungsten containing catalyst such as cobalt molybdate on alumina at 25 to 300° C.

It is therefore the object of this invention to provide a process for converting 1,2-bis(3-cyclohexen-1-yl)ethylene and alkyl derivatives thereof to novel thiols and/or sulfides.

Other objects and many of the attendant advantages of this invention will be readily appreciated as the same becomes better understood by reference to the following detailed description.

According to the process of this invention, novel mercaptans and/or sulfides are prepared by the reaction of a compound of the formula RSH wherein R is selected from the group consisting of hydrogen and alkyl, aryl, cycloalkyl, and combinations thereof such as aralkyl and alkaryl, containing from 1 to 2 carbon atoms, inclusive, with a 1,2-bis(3-cyclohexen-1-yl)ethylene of the formula

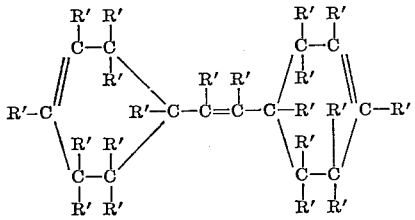

wherein R' is hydrogen or methyl or ethyl radicals, and the total number of carbon atoms does not exceed 22.

Some specific examples of these 1,2-bis(3-cyclohexen-1-yl)ethylenes are 1,2-bis(3-cyclohexen-1-yl)ethylene
1-(3-cyclohexen-1-yl)-2-(2-methyl-3-cyclohexen-1-yl) ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene Some examples of compounds of the formula RSH which can be reacted with 1,2-bis(3-cyclohexen-1-yl) ethylenes by operating according to the process of this invention are: hydrogen sulfide, methyl mercaptan, ethyl mercaptan, n-propyl mercaptan, tert-butyl mercaptan, n-octyl mercaptan, n-dodecyl mercaptan, thiophenol, p-tolyl mercaptan, cyclohexyl mercaptan, benzyl mercaptan, cyclooctyl mercaptan, cyclododecyl mercaptan, 4-n-hexyl mercaptan, 1-naphthyl mercaptan, and the like.

The reaction of hydrogen sulfide or a mercaptan with a 1,2-bis(3-cyclohexen-1-yl)ethylene can be effected in the presence of a free radical initiator or an acid-type clay. The preferred initiators for the reaction are the free radical type including chemical sources of free radicals such as peroxides and azobisnitriles, and ultraviolet light.

Typical free radical initiators which can be employed for the reaction of the RSH compounds with the 1,2-bis (3-cyclohexen - 1-yl)ethylenes include organic azo compounds, peroxide compounds and actinic radiation. Representative of peroxide compounds which can be used for this purpose include ditertiaryalkyl peroxides such as ditertiarybutyl peroxide and other peroxides such as alkylhydroperoxides, alkylperoxy esters, diacyl peroxides, and the like. Suitable azo catalysts which can be used representatively can be those having acyclic azo groups, —N=N—, bonded to different nonaromatics, that is, aliphatic or cycloaliphatic carbons, at least one of which is tertiary, e.g. alpha-alpha'-azodiisobutyronitrile, and the like, such as those disclosed in U.S. Pat. 2,471,959; 2,492,763; and 2,503,253.

The actinic radiation which can be used as a free radical catalyst in the process of this invention will generally have a potential or energy level in the range of 3.1 to 1×10⁸ electron volts. The radiation dose rate will generally be from $10^3$ to $10^7$ roentgens equivalent physical per hour (rep/hour) and the total radiation dosage will generally be from $10^5$ to $10^{11}$ reps, preferably $10^7$ to $10^9$ reps. Lower radiation rates can be used but are not practical from a time standpoint since the rate of reaction will be correspondingly slow, and higher rates, although usable, are difficult to attain and are not necessary in the process of this invention. The radiation dosages and rates, as used herein, are internal or actual dosages and rates received by the reaction system.

Actinic radiation useful in the practice of this invention includes activating rays such as ultraviolet rays having a wave length in the range of 100 to 3800 Angstroms, and ionizing rays such as alpha rays, beta rays, gamma rays, X-rays, deuterons, protons, and neutrons. The ultraviolet rays can be supplied from lamps or other apparatus which are available for generation of such rays. Sources of radiation include electrical devices such as cathode tubes, which produce electrons, and various accelerators. The natural and artificial and radioactive elements can also be used as sources of radiation, as can spent fuel elements, which are particularly preferred as they represent a low cost source of ionizing radiation.

Reaction promoters can be used in the method of this invention when free radical catalysts are utilized. In particular, organic trialkyl prosphites having the general formula $(R''O)_3P$ where $R''$ is an alkyl radical having 1–10 carbon atoms, and preferably where each $R''$ is the same normal alkyl radical having 1–5 carbon atoms can be used as promoters, particularly in conjunction with ultraviolet radiation. The amount of promoter used can vary and stated functionally will be that amount sufficient to promote the reaction and increase the conversion. For most applications, the amount of reaction promoter will be in the range of 0.001 and 100 mols per mol of 1,2-bis(3-cyclohexen-1-yl)ethylene.

Representative phosphite reaction promoters useful in conjunction with free radical initiators include trimethyl phosphite, triethyl phosphite, triisopropyl phosphite, tri-n-butyl phosphite, tri-n-pentyl phosphite, dimethyl ethyl phosphite, diethyl methyl phosphite, methyl ethyl n-propyl phosphite, diethyl n-butyl phosphite, tri-n-octyl phosphite, tri-n-decyl phosphite, and the like.

When the reaction of an RSH compound with a 1,2-bis(3-cyclohexen-1-yl)-ethylene is effected in the presence of a free radical initiator, the reaction can also be carried out in the presence of inert diluents such as saturated hydrocarbons.

The reaction of this invention can be carried out in a batchwise, intermittent, or continuous manner. The reaction temperature can vary over a wide range and will generally fall within the range of from $-50$ to $300°$ F., preferably from 0 to $150°$ F., although the upper limit is dictated by the pressure which can conveniently be contained. The pressure at which the reaction is carried out can also vary depending upon the vapor pressure of the reactants and inert diluents, if used and will generally range from atmospheric up to 5000 p.s.i.g. or higher, preferably up to 2000 p.s.i.g. Generally speaking, the reaction times can fall within the range between a few minutes and 20 hours, preferably from 1–5 hours. The mol ratio of RSH compound to 1,2-bis(3-cyclohexen-1-yl)ethylene can vary over a wide range, from as low as 0.5:1 to 20:1, preferably from 3:1 to 20:1, depending upon which RSH reactant is used and the desired product. For example, if $H_2S$ is employed as the RSH reactant, and a sulfide is desired, mol ratios as low as 0.5:1 can be used.

As will be shown hereinafter in the specific example, only two of the three available double bonds in the 1,2-bis(3-cyclohexen-1-yl)ethylenes are reactive and the end products will still contain at least one double bond. This is true even though extremely high mol ratios of RSH reactants are employed. The novel compositions produced in the reaction described hereinabove can be characterized by the following formulas:

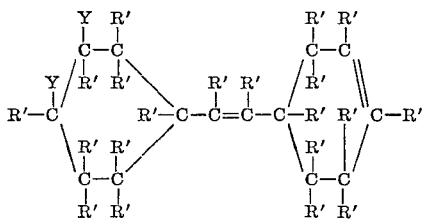

where Y is —H or —SR and one Y is —SR

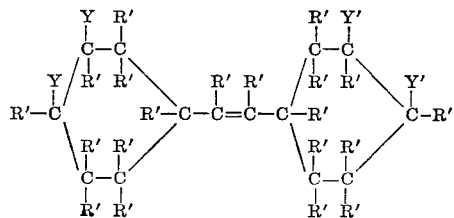

where Y and Y' are —H or —SR and one Y is —SR and one Y' is —SR.

Some specific examples of the products obtained by the practice of this invention are 1-(3-mercaptocyclohexyl)-2-(3-cyclohexen-1-yl)ethylene
1-(4-mercaptocyclohexyl)-2-(3-cyclohexen-1-yl)ethylene
1-(3-mercaptocyclohexyl)-2-(4-mercaptocyclohexyl) ethylene
1,2-bis(3-mercaptocyclohexyl)ethylene
1,2-bis(4-mercaptocyclohexyl)ethylene
1-(3-methylthiocyclohexyl)-2-(3-cyclohexen-1-yl) ethylene
1-(3-methylthiocyclohexyl)-2-(4-methylthiocyclohexyl) ethylene
1,2-bis(3-methylthiocyclohexyl)ethylene
1,2-bis(4-methylthiocyclohexyl)ethylene
1-(3-ethylthiocyclohexyl)-2-(3-cyclohexen-1-yl)ethylene
1,2-bis(4-ethylthiocyclohexyl)ethylene
1-(4-n-propylthiocyclohexyl)-2-(3-cyclohexen-1-yl) ethylene
1,2-bis(3-tert-butylthiocyclohexyl)ethylene
1-(3-n-octylthiocyclohexyl)-2-(3-cyclohexen-1-yl) ethylene
1,2-bis(4-phenylthiocyclohexyl)ethylene
1-(3-p-tolylthiocyclohexyl)-2-(4-p-tolylthiocyclohexyl) ethylene
1,2-bis(3-cyclohexylthiocyclohexyl)ethylene
1,2-bis(4-benzylthiocyclohexyl)ethylene
1,2-bis(3-cyclododecylthiocyclohexyl)ethylene
1-[3-(1-naphthylthiocyclohexyl)]-2-(3-cyclohexen-1-yl) ethylene
1,2-bis(1-methyl-3-mercaptocyclohexyl)ethylene
1,2-bis(2-methyl-4-methylthiocyclohexyl)ethylene
1-(3-ethyl-4-ethylthiocyclohexyl)-2-(3-ethyl-3-cyclohexen-1-yl)ethylene
1,2-bis(4-methyl-3-tert-butylthiocyclohexyl)ethylene
1-(2,2-dimethyl-4-mercaptocyclohexyl)-2-(6,6-dimethyl-3-cyclohexen-1-yl)ethylene
1,2-bis(2,6-dimethyl-3-phenylthiocyclohexyl)ethylene
2,3-bis(4-methyl-3-mercaptocyclohexyl)butene-2
2,3-bis(1,3,4-trimethyl-4-cyclohexylthiocyclohexyl) butene-2
3,4-bis(4-ethyl-3-benzylthiocyclohexyl)hexene-3
1-(3-methyl-3-mercaptocyclohexyl)-2-(2-methyl-6-ethyl-3-mercaptocyclohexyl)ethylene The novel mercaptans and/or sulfides produced by the process of this invention have wide utility. These compounds can be used as intermediates for the preparation of pesticides and repellents, and as rubber polymerization chemicals, as for example, polymerization modifiers in the emulsion polymerization of conjugated dienes to form synthetic rubber.

The following specific example serves to illustrate the process of this invention, but it is not intended that the invention be limited to the specific features shown in this example.

EXAMPLE

A run was carried out in which 1,2-bis(3-cyclohexen-1-yl)ethylene was reacted with hydrogen sulfide according to the process of this invention.

In this run, a mixture of 188 grams (1 mol) of 1,2-bis(3-cyclohexen-1-yl)ethylene, 204 grams (6 mols) of hydrogen sulfide and 2 ml. of trimethyl phosphite was irradiated with the light from a 100 watt mercury vapor lamp for one hour at 25–34° C. This reaction time was followed by an additional one hour irradiation with light from a 450 watt mercury vapor lamp at the same temperature. After weathering off the unreacted hydrogen sulfide, the reaction mixture, amounting to 250.7 grams and having a refractive index $n_D^{20}$ of 1.5481 was flashed at reduced pressure. The overhead from this flash, amounting to 185 grams, was redistilled to yield 49 grams of 1-(3- and/or 4-mercaptocyclohexyl)-2-(3-cyclohexen-1-yl)ethylene and 105 grams of 1,2-bis(3- and/or 4-mercaptocyclohexyl)ethylene. No trimercaptan was isolated from the reaction mixture. The structures of the two products were confirmed by nuclear magnetic resonance (NMR).

In addition to the confirmation by NMR, the following elemental analyses were obtained on the two products:

ELEMENTAL ANALYSIS OF MONOMERCAPTAN

| Element: | Calculated for $C_{14}H_{22}S$, Wt. percent | Found wt. percent |
|---|---|---|
| Carbon | 75.61 | 75.2 |
| Hydrogen | 9.97 | 10.2 |
| Mercaptan sulfur | 14.42 | 15.0 |

ELEMENTAL ANALYSIS OF DIMERCAPTAN

| Element: | Calculated for $C_{14}H_{24}S_2$, Wt. percent | Found wt. percent |
|---|---|---|
| Carbon | 65.56 | 65.5 |
| Hydrogen | 9.43 | 9.3 |
| Mercaptan sulfur | 25.01 | 23.3 |

The monomercaptan boiled at 161–162 at 3.75 mm. mercury absolute pressure and had a refractive index $n_D^{20}$ of 1.5293. The dimercaptan boiled at 185° C. at 2.25 mm. mercury absolute pressure and had a refractive index of $n_D^{20}$ of 1.5532.

Obviously, many modifications and variations of the present invention are possible in the light of the above teachings. It is therefore to be understood that the invention may be practiced otherwise than as specifically described herein.

I claim:
1. A process for forming compounds of the formula:

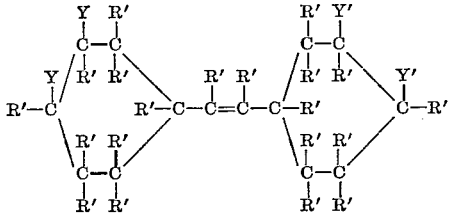

wherein Y and Y' are —H or —SR, one Y is —SR, and one Y' is —SR, and wherein R and R' are as defined hereinafter, comprising reacting at least one compound of the formula

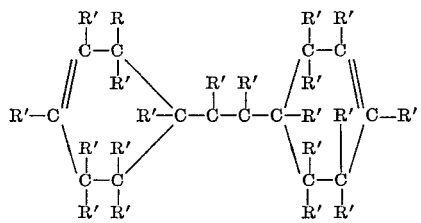

wherein R' is hydrogen, methyl or ethyl and the total number of carbon atoms does not exceed 22, with a compound of the formula RSH wherein R is hydrogen and alkyl, aryl, cycloalkyl, aralkyl or alkaryl containing from 1 to 12 carbon atoms in the presence of an activating catalysts, the amount of RSH employed being that which is effective to form the recited product.

2. A method according to claim 1 wherein said reaction is carried out in the presence of actinic radiation and a trialkyl phosphite.

3. A process according to claim 1 wherein the compound reacted with the RSH is 1,2-bis(3-cyclohexen-1-yl)ethylene.

4. A method according to claim 1 wherein 1,2-bis(3-cyclohexen-1-yl)ethylene is reacted with hydrogen sulfide in the presence of trimethylphosphite and actinic radiation.

5. A method according to claim 4 wherein the mol ratio of the RSH compound to the 1,2-bis(3-cyclohexen-1-yl)ethylene is from 3:1 to 20:1.

No references cited.

CHARLES B. PARKER, Primary Examiner

D. R. PHILLIPS, Assistant Examiner

U.S. Cl. X.R.

260—609